United States Patent [19]

Clark

[11] 4,242,570
[45] Dec. 30, 1980

[54] ELECTRIC SKILLET HAVING REMOVABLY ATTACHABLE HANDLE

[75] Inventor: Robert H. Clark, Columbia, Mo.

[73] Assignee: McGraw-Edison Company, Rolling Meadows, Ill.

[21] Appl. No.: 935,583

[22] Filed: Sep. 8, 1978

[51] Int. Cl.³ .............................................. A47B 95/02
[52] U.S. Cl. ................................ 219/441; 16/114 R
[58] Field of Search ............... 219/430, 432, 438, 439, 219/441, 442; 16/114 R, 114 A, 114 B; 220/94

[56] References Cited

U.S. PATENT DOCUMENTS

| | | | |
|---|---|---|---|
| 2,478,784 | 8/1949 | Serio | 16/114 A |
| 2,834,868 | 5/1958 | Greene et al. | 219/442 |
| 3,025,384 | 3/1962 | Schwaneke | 219/442 |
| 3,030,487 | 4/1962 | Parr | 219/442 |
| 3,157,909 | 11/1964 | Schmitt | 16/114 A |
| 3,269,765 | 8/1966 | Pryce | 16/114 A |

FOREIGN PATENT DOCUMENTS

| | | | |
|---|---|---|---|
| 492131 | 9/1938 | United Kingdom | 16/114 A |
| 689481 | 3/1953 | United Kingdom | 16/114 A |

Primary Examiner—Andrew V. Kundrat
Attorney, Agent, or Firm—Jon Carl Gealow; Ronald J. LaPorte; Roy A. Ekstrand

[57] ABSTRACT

An electric skillet or the like cooking vessel includes a cooking pan and a removably attachable insulative handle having a temperature control assembly with a spring loaded temperature sensing "shoe". One portion of the side wall of the pan defines a raised temperature sensing area against which the "shoe" is pressed upon joining the pan and handle. A lip extends from the raised area and forms a recess between the lip and sidewall of the pan. A first end of a torsion spring mounted on the handle for rotation is received in the recess for engagement with the lip subsequent to joining the handle and pan and rotating the spring to a first, locked position. The opposite end of the spring is received beneath a shoulder provided on the handle, thereby twisting the torsion spring to cause the first end thereof to forcibly engage the lip. Release of the opposite end of the torsion spring by rotation in the opposite direction disengages the first end of the spring and lip thereby to unlock the handle and pan, permitting the two to be separated.

9 Claims, 4 Drawing Figures

ELECTRIC SKILLET HAVING REMOVABLY ATTACHABLE HANDLE

BACKGROUND OF THE INVENTION

This invention relates generally to electric skillet and the like cooking vessels and more particularly to such cooking vessels including a removably attachable handle assembly.

Prior art electric skillet or the like cooking vessels conventionally include a pan to which an insulative handle for lifting the pan is permanently attached. In some cases, a temperature control assembly is included in the handle and in other cases, the temperature control assembly is provided in a separate probe member removably connectable to the pan through a male-female plug arrangement. In the case of the removable probe member, a spring loaded "shoe" coupled to the thermostat of the temperature control assembly, is sometimes employed to sense the temperature of the pan. The spring loaded "shoe" engages a wall of the pan upon coupling the probe member thereto. Examples of cooking vessels of the last-mentioned type are shown in U.S. Pat. Nos. 3,030,487; 3,025,384; and 2,834,868.

None of the above-mentioned prior art patents shows a cooking vessel including a handle that is removably attachable to the pan and which also includes a temperature control arrangement having a temperature sensing "shoe".

Other non-electric skillets and cooking vessels do include handles which are removably secured to the pan thereof. Often, however, the mechanism by which the handle is attached to the pan is complex in design and does not lend itself to easy and quick removal and attachment, which is required in the case of a handle employed on an electric skillet including a temperature control assembly since it is desirable that the latter not be exposed to water during cleaning and the like.

SUMMARY OF THE INVENTION

Accordingly, it is a primary object of the present invention to provide an electric skillet or the like cooking vessel including a handle for lifting said vessel which is removably attachable to the skillet pan and which handle includes a temperature control assembly having a temperature sensing "shoe".

It is another object of the present invention to provide a new and improved locking arrangement for removably attaching an insulated handle to the pan portion of a skillet or the like cooking vessel which arrangement provides for quick and easy removal and attachment of the handle to the pan.

It is yet another object of the present invention to provide an electric skillet or the like cooking vessel including a removably attachable insulative handle including a temperature control assembly with a spring loaded temperature sensing "shoe", which handle also includes a locking arrangement according to the invention for quickly and easily removably securing the handle to the pan of the cooking vessel.

Briefly, a preferred embodiment of an electric skillet according to the invention includes a cooking pan and a removably attachable handle including a temperature control assembly with a spring loaded temperature sensing "shoe" mounted thereon. One portion of the side wall of the skillet pan defines a temperature sensing area against which the spring loaded sensing "shoe" is pressed upon joining the handle to the pan. A lip extending from the wall area defines a recess between the lip and said wall of the pan in which a first end of a rotatable locking torsion spring provided on the handle adjacent the temperature sensing "shoe", is received. The spring is rotated to a first unlocked position prior to joining the handle to the pan. After joining the latter, a second, free end of the spring is rotated to insert the first end therof into the recess, thereby securing the handle to the pan. The second end of the spring is rotated until an end portion thereof is received beneath a shoulder formed on the handle thereby locking the handle and pan in a joined condition. The rotation of the second end of the spring twists the latter along its axis, causing the first end of the spring to forcibly engage the wall area or the lip defining the recess, thereby securely locking the handle and pan together.

DETAILED DESCRIPTION

Figure 1:
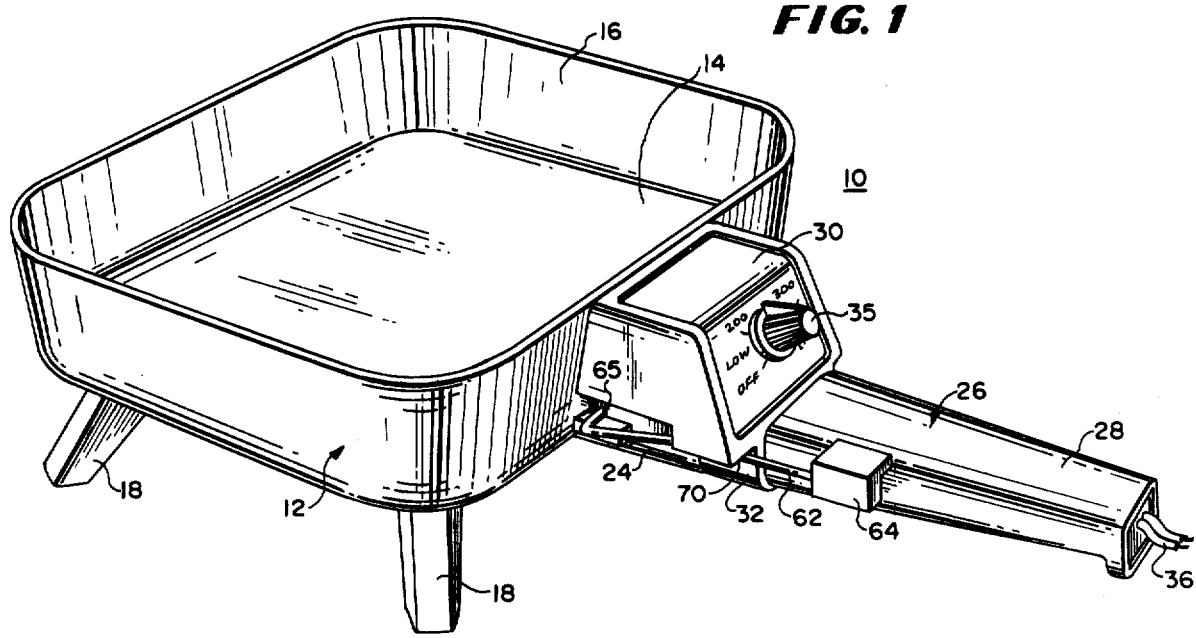
FIG. 1 is a perspective view of an electric skillet including a separable pan and insulative handle and a locking arrangement for removably securing the pan and handle in a joined condition according to the invention.

Referring now to the drawings in greater detail wherein like numerals have been employed to designate similar elements throughout the various views, an electric skillet, designated by the numeral 10, is illustrated in FIG. 1. The skillet includes a pan 12, herein shown as having a generally square shape, in which food to be cooked is placed. The pan includes a base wall 14 and a raised sidewall 16, joined thereto, extending about the periphery thereof. Insulative legs such as 18, are attached to the exterior surface of the base wall 14 of pan 12 to support the pan away from a surface on which it stands. A sheathed electric heating element 20 (FIGS. 3 and 4) of a conventional type, is also mounted on the exterior surface of the base wall in a suitable manner for heating food placed in the pan. Male terminals 22 of the heating element 20 extend outwardly from the base wall of the pan and are surrounded by a sleeve 24 also mounted on the exterior surface of the base wall.

Figure 2:
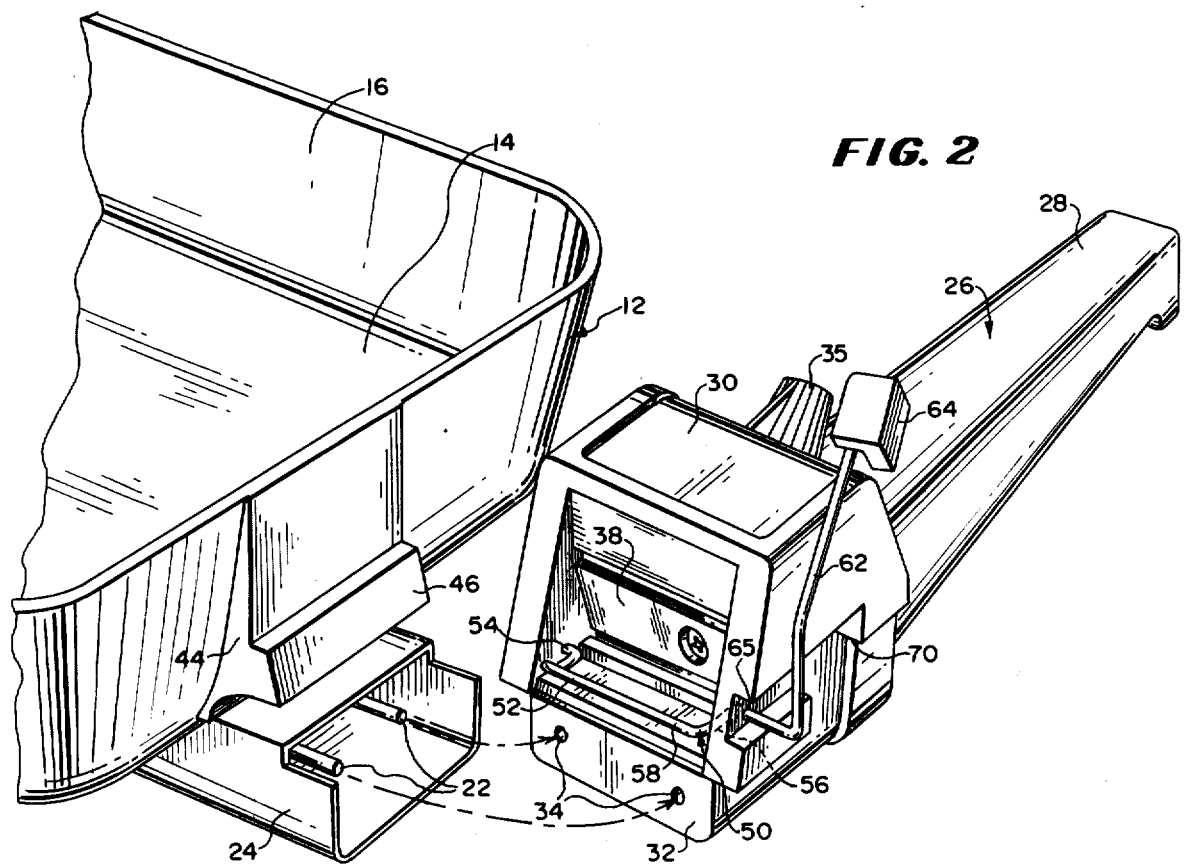
FIG. 2 is an enlarged, fragmentary, perspective view of the skillet of FIG. 1 shown with the pan and insulative handle in a separated condition, illustrating the locking arrangement according to the invention.

Skillet 10 also includes a separate insulative handle 26 which is removably attachable to pan 12. The handle 26 includes a first end 28 which a user grasps to lift and transport the skillet and a second end 30 which is designed for joining the handle to pan 12. End 30 of the handle 26 includes a portion 32 dimensioned for receipt in sleeve 24 of pan 12, whereby the pan and handle are joined (FIG. 2). Within portion 32 of the handle end 30 is positioned female electrical terminals 34 for receiving male terminals 22 of the heating element 20 upon joining the handle and pan, thereby providing electrical energy to element 20. A power cord 36 shown in FIG. 1, passes through handle 26 to the terminals 34. The opposite end of the power cord (not shown) is provided with a conventional male connector receivable in a conventional outlet providing household current.

Figure 3:
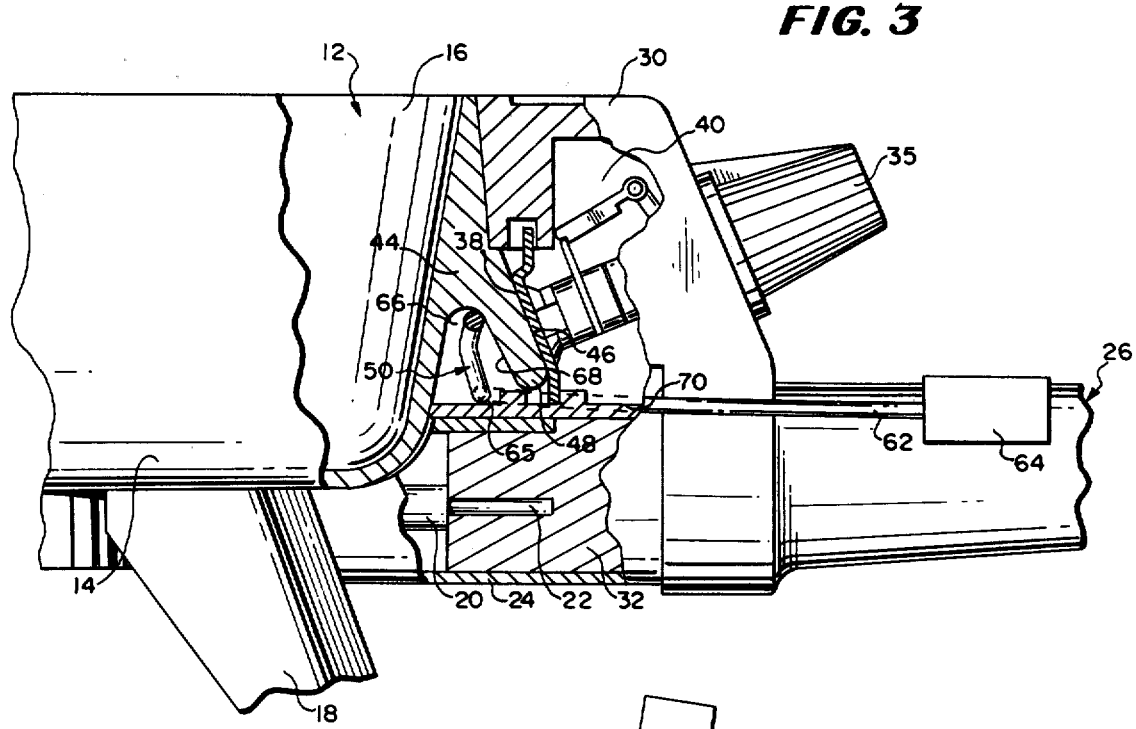
FIGS. 3 and 4 are enlarged, partially sectioned, side views of the skillet of FIG. 1 illustrating the operation of the locking arrangement for removably securing the pan and handle in a joined condition according to the invention.
Figure 4:
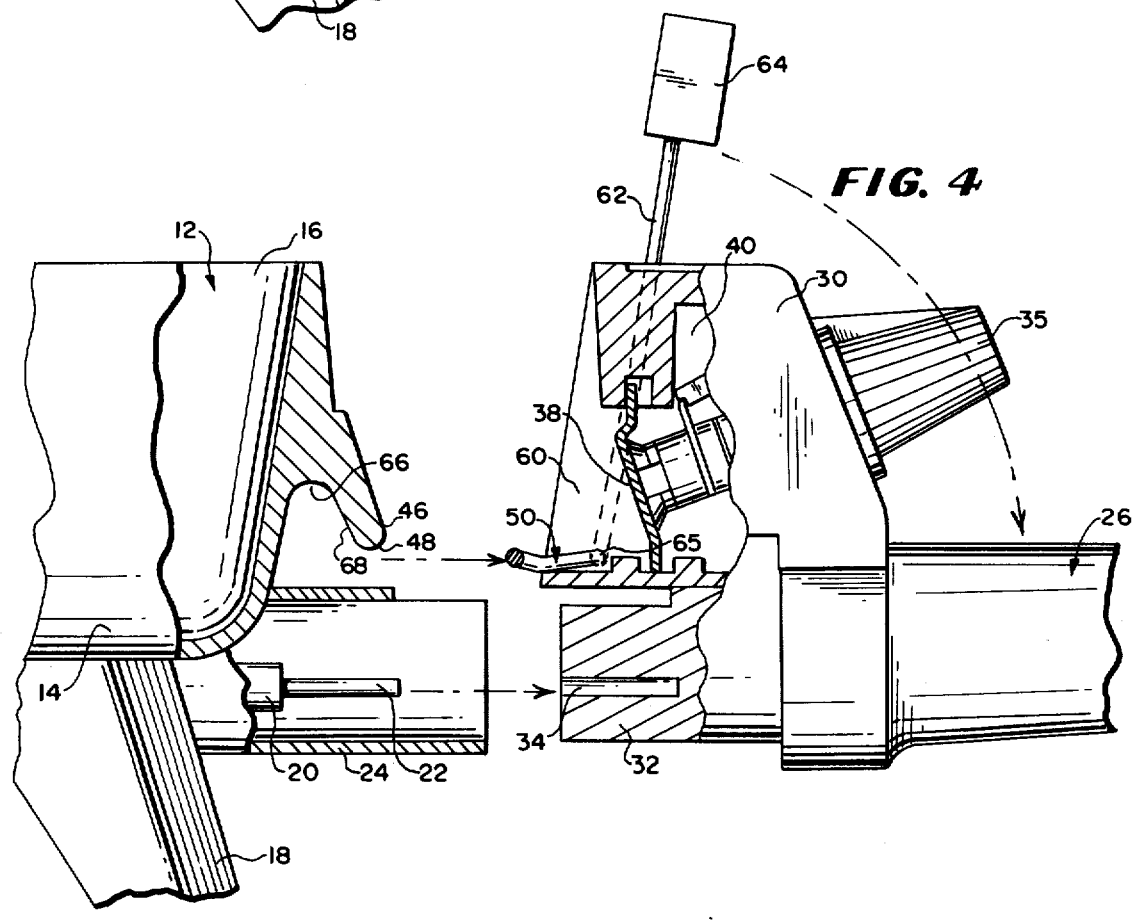

The end 30 of the handle includes a temperature control circuit (not shown) of a conventional type for selectively controlling the temperature of the skillet pan 12. A manual control knob 35 coupled to the temperature control circuit permits a user to adjust the pan temperature as desired. A temperature sensing "shoe" 38 also of a conventional type is included as a part of the temperature control circuit. The "shoe" is retractable into a recess 40 formed in end 30 of the handle. A spring on "shoe" 38 biases the latter outwardly of the recess as shown in FIGS. 2 and 4 of the drawings. "Shoe" is as shown in FIG. 3 of the drawings, positioned for engagement of the sidewall 16 of pan 12 to sense the pan temperature. In the case of the skillet according to the invention, a bracket 44 is formed integrally with the sidewall 16 of pan 12 to provide both a raised temperature sensing planar area 46 against which the sensing "shoe" is urged upon joining handle 26 to the pan and a lip 48, which as will be described in greater detail hereinafter, forms along with a torsion spring 50 mounted on handle 26, a locking assembly for securing the handle and pan in a joined condition.

The torsion spring 50 comprises a resilient length of rod-like spring metal which is bent to form a "U-shaped" first end 52 (FIG. 2). The ends of the legs 54 and 56 of the "U" are bent outwardly substantially parallel to the bight 58 thereof. As seen in the drawings, the ends of the legs 54 and 56 are mounted for rotation in suitable openings in sidewalls, (FIG. 2) only one 60, of which is shown, defining recess 40. The second end 62 of spring 50 passes through the handle end 30 and is bent to extend along the handle 26. A block 64 is provided on the free end of the spring. End 62 of the spring is manually rotatable about axis 65 (FIG. 3) to position the "U-shaped" end 52 of the spring in locked and unlocked positions, shown respectively, in FIGS. 3 and 4.

Referring now to FIGS. 3 and 4 of the drawings, the operation of the locking assembly for removably securing the handle 26 in pan 12 of the skillet in a joined condition, will be described.

Prior to joining the handle 26 and pan 12 of the skillet, end 62 of spring 50 must be rotated to move end 52 of the spring to its unlocked position as shown in FIG. 4. In this position, end 52 of spring 50 will not interfere with lip 48 of bracket 44 when attempting to join the handle and pan.

Subsequent to insertion of end portion 32 of handle 26 into sleeve 24 of pan 12, to join the two, end 62 of spring 50 is rotated in the direction of the arrow in FIG. 4 to in turn rotate end 52 into cavity 66 defined between lip 48 and sidewall 16 of the pan.

End 62 of the torsion spring 50 is rotated so that the opposite end 52 of the spring engages wall 68 of lip 48 of the bracket 44. Continued rotation of end 62 of the spring tends to twist the spring along its axis, urging end 52 into forcable engagement with lip 48. When end 62 has been rotated sufficiently, spring end 62 can be moved sideways toward the handle 26, and positioned under shoulder 70 securing the spring in a locked condition. In this fashion, the force of torsion spring 50 remains effective to secure the handle and pan in the joined condition.

As a safety feature, electrical connection between the male and female terminals 22 and 34, respectively, will not be made during joinder of the handle and pan until spring 50 is rotated predeterminedly toward the locked position, whereby engagement of end 52 of the spring is begun with bracket 44.

Removal of the spring end 62 from beneath shoulder 70 releases the torsional force of spring 50 against lip 48. Rotation of the end 62 of spring 50 opposite the arrow (FIG. 4) rotates end 52 of the torsion spring out of recess 66 and out of engagement with wall 68 of the lip 48, unlocking the pan and handle. Thereafter, portion 32 of end 30 of the handle may be withdrawn from sleeve 24 to separate the handle from the pan.

With the skillet according to the invention, pan 12 may be immersed in water for cleaning, as the electrical heating element 20 is sealed and the remaining electrical components are included in the handle 26 which, as shown, is detachable from pan 12.

The locking assembly included as a part of the skillet 10 is simple in construction, yet effective for securing the pan and handle in a joined condition, even when the pan 12 is filled with food to be cooked or with cooking oil. The bracket 44 positioned at the sidewall 16 of pan 12 provides both a location which "shoe" contacts for sensing the temperature of the pan as well as a member for receiving end 52 of the torsion spring 50 for locking the pan and handle in a joined condition. While a particular embodiment of the invention has been shown and described, it should be understood that the invention is not limited thereto since many modifications may be made. It is, therefore, contemplated to cover by the present application any and all such modifications as fall within the true spirit and scope of the appended claims.

I claim:

1. A skillet or the like cooking vessel including a pan into which foods to be cooked are placed, an insulative handle for lifting said pan, said pan and said handle including complementarily engageable means for joining said handle to said pan, said locking arrangement including in combination;

a bracket provided on said pan and a torsion spring mounted on said handle, said torsion spring being movable to a first, locked position whereby a first end thereof engages said bracket subsequent to joining said handle and said pan, and the opposite end of said torsion spring is simultaneously moved to a position whereby said spring is twisted to urge said first end thereof into forcible engagement with said bracket, thereby securing said handle to said pan, said spring being moveable to a second, released position whereby said spring is in a relaxed condition with said first end of said spring being disengaged from said bracket to unlock said pan and handle, thereby permitting disjoinder of said handle and said pan and wherein said complementarily engageable means of said pan and insulative handle includes a sleeve provided on said pan adjacent said bracket portion and a first end of said handle, dimensioned for receipt in said sleeve, respectively.

2. A skillet as claimed in claim 1, wherein said pan includes a sidewall extending thereabout, wherein said bracket portion is located on said sidewall and defines a recess, and wherein the first end of said torsion spring is receivable in said recess upon movement of said spring to said first, locked position.

3. A skillet as claimed in claim 2, wherein the first end of said torsion spring is substantially "U-shaped" with the ends of the legs of the "U" being substantially parallel to the bight thereof and mounted on said handle for rotation thereabout, wherein said second end of said spring extends from the end of one leg of said "U" and is parallel to said legs, whereby upon rotating said second spring end, said "U-shaped" first end of said spring is also rotated, said "U-shaped" end being rotatable into said recess upon moving said spring to said first, locked position.

4. A skillet as claimed in claim 1, wherein said second end of said torsion spring includes first engaging means and wherein said handle includes second engaging means, said first and second engaging means being engageable upon moving said torsion spring to said locked position, thereby to maintain said locking force until released.

5. A skillet as claimed in claim 4 wherein said first engaging means includes the free end of the second end of said torsion spring and wherein said second engaging means includes a shoulder portion of said handle for engagement of said free end upon moving said spring to said locked position.

6. A skillet or the like cooking vessel as claimed in claim 1, wherein said pan includes an electric heating element on said base wall thereof, said element including terminals extending outwardly therefrom along and spaced from said base wall, said terminals being surrounded by said sleeve, the latter being joined to the exterior surface of said base wall, wherein said first end of said handle includes complementary terminals for making an electrical connection with the terminals of said heating element, thereby to provide electrical energy thereto, said handle further including a temperature control arrangement for controlling the temperature of said pan, said control arrangement including a thermostat and a temperature control member extending from said first end of said handle for sensing the temperature of said pan and wherein said bracket includes a planar portion for engagement by said temperature sensing control member upon joining said handle and pan, thereby to sense the temperature of said pan.

7. A skillet or the like cooking vessel as claimed in claim 6, wherein said bracket is formed integrally with the sidewall of said pan, said planar portion is defined as a raised sidewall portion positioned for engagement with said temperature sensing member upon joining said handle and pan, and wherein a lip portion extends outwardly from said bracket to define said recess between said lip portion and said sidewall of said pan, into which said first end of said torsion spring is received upon rotating the spring to said first, locked position.

8. A skillet or the like cooking vessel as claimed in claim 7, wherein the first end of said handle defines a recess dimensioned for receiving said bracket therein, said sensing member and said first end of said torsion spring being mounted in said handle recess, whereby upon joining said handle and pan, said first end of said torsion spring and sensing member are enclosed between the sidewall of said pan and said handle, thereby preventing access thereto.

9. A skillet or the like cooking vessel as claimed in claim 7 wherein said torsion spring is rotatable to a second unlocked position wherein said first end thereof is positioned for disengagement with respect to said lip portion of said bracket, to permit joinder of said handle and pan, said complementary electrical terminals being joined sufficiently to create electrical contact therebetween only after said pan and handle are joined and said torsion spring is rotated predeterminedly toward said first locked position.

* * * * *